United States Patent [19]
Miller, III et al.

[11] Patent Number: 5,799,893
[45] Date of Patent: Sep. 1, 1998

[54] MULTI-LEVEL LOAD LIMITING TORSION BAR RETRACTOR

[75] Inventors: H. John Miller, III, Macomb Township; Gerald Keller, Shelby Township, both of Mich.

[73] Assignee: AlliedSignal Inc., Morristown, N.J.

[21] Appl. No.: 801,234

[22] Filed: Feb. 19, 1997

[51] Int. Cl.⁶ .................................................. B60R 22/28
[52] U.S. Cl. ............................. 242/379.1; 280/805
[58] Field of Search ...................... 242/379.1; 280/805, 280/806; 297/470, 471, 472

[56] References Cited

U.S. PATENT DOCUMENTS

| | | | |
|---|---|---|---|
| 5,522,564 | 6/1996 | Schmidt et al. | 242/379.1 |
| 5,526,996 | 6/1996 | Ebner et al. | 242/379.1 |
| 5,611,498 | 3/1997 | Miller et al. | 242/379.1 |
| 5,626,306 | 5/1997 | Miller et al. | 242/379.1 |

*Primary Examiner*—John M. Jillions
*Attorney, Agent, or Firm*—Markell Seitzman

[57] ABSTRACT

An energy absorbing retractor having a frame, locking mechanisms to initially stop a spool from rotating in a belt protraction direction, the spool rotationally supported relative to the frame, a seat belt wound about the spool, and bias means to retract the seat belt, a two sided torsion bar for generating at least a first level of reaction torque on the spool permitting the spool to rotate in a controlled manner in a belt protracting direction including a torsion bar having a middle portion fixedly coupled to the spool to prevent relative rotation therebetween, a first torsion rod extending therefrom, the first torsion rod including a first end coupled to a first locking mechanism to prevent the first end from rotating upon such coupling, whereby upon locking of the first end, and the loading of the spool, the first torsion rod is twisted to generate a first level of control force.

9 Claims, 4 Drawing Sheets

MULTI-LEVEL LOAD LIMITING TORSION BAR RETRACTOR

BACKGROUND AND SUMMARY OF THE INVENTION

The present invention generally relates to seat belt retractors which include a means for absorbing or dissipating crash energy. More particularly, the present invention relates to a seat belt retractor having a multi-level reaction force generating torsion bar therein.

In a conventional seat belt retractor, a web or a vehicle (often called inertial) sensor is used to stop the rotation of a spool to prevent the protraction of the seat belt webbing during an accident. A second class of seat belt retractors permits the controlled protraction of the seat belt by incorporating within the retractor an energy absorption (or dissipation) mechanism which permits the spool to rotate after the retractor has been initially locked up. In the past these mechanisms have included crushable bushings (U.S. Pat. No. 5,547,143), deformable tubes (U.S. Pat. No. 3,881,667) or torsion bars (U.S. Pat. No. 3,741,494).

It is an object of the present invention to provide an energy absorbing retractor that has one or more load limiting levels, a retractor that may be activated either mechanically or electrically, and one which utilizes a unique energy absorbing (dissipating) mechanism.

Accordingly the invention comprises: an energy absorbing retractor having a frame, locking mechanisms to initially stop a spool from rotating in a belt protraction direction, the spool being rotationally supported relative to the frame, a seat belt wound about the spool, bias means to retract the seat belt, and torsion bar means for at least a first level of reaction torque on the spool permitting the spool to rotate in a controlled manner in a belt protracting direction including a torsion bar having a middle portion and a first torsion rod (or torque or torsion tube) extending therefrom, the middle portion fixedly coupled to the spool to prevent relative rotation therebetween, the first torsion rod including a first end coupled to first locking mechanisms to prevent the first end from rotating upon such coupling, whereby upon locking of the first end, and the loading of the spool, the first torsion rod is twisted, permitting the spool to rotate, to generate a first level of control force. A second torsion rod (or torque or torsion tube) is provided which can generate a second level of reaction force. A third level of reaction force is attainable if both torsion rods are activated.

Many other objects and purposes of the invention will be clear from the following detailed description of the drawings.

DETAILED DESCRIPTION OF THE DRAWINGS

Figure 2:
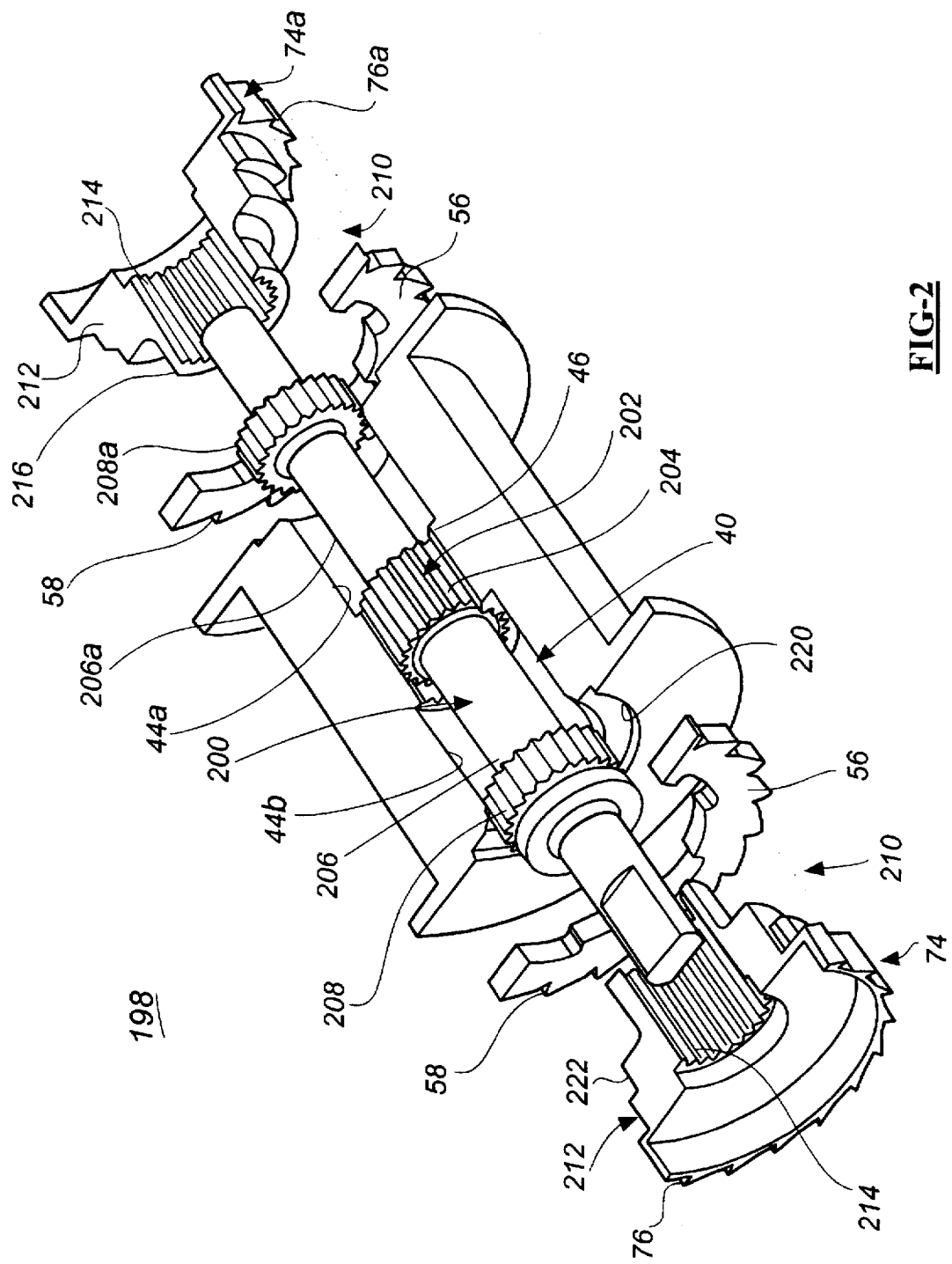
FIG. 2 is an isolated isometric view showing an axle assembly.

Reference is made to the drawings which show a cross-sectional view of a seat belt retractor 20 constructed in accordance with the present invention. The retractor includes a U-shaped frame 22 having frame sides 24a and 24b and a rear portion 24c. Part 24c includes a mounting opening 26. Each side 24a and b includes a respective circular opening 28a and 28b. Rotatably supported on the frame 22 is a spool generally shown as 30. The spool includes a center portion 32 and flanges 34a and 34b. A length of seat belt webbing 36 is wound upon the center part of the spool. An inner end of the seat belt is received within a slot 37 formed within the spool in a known manner. The spool 30 further includes a central, stepped through bore 40 having a narrow center section 42 and two opposing wider end sections 44a and 44b. The narrow section 42 includes internal teeth or splines 46 as are more clearly shown in FIG. 2.

Situated in the through bore 40 is an axle assembly 198 comprising a torsion bar assembly 200 having a center section 202 having splines 204 which mate with splines 46 of the through bore 40 to prevent the center section 202 of the torsion bar assembly from rotating relative to the spool 30. The torsion bar assembly includes a first extending torsion rod 206 which terminates in a splined section 208. The diameter of the splined section 208 is larger than the diameter of the torsion bar 206. Extending from the center section 202, opposite to rod 206, is a second torsion rod 206a which terminates in a splined section 208a. Either torsion rod 206 or 206a can be replaced by a torque or torsion tube 206' shown in phantom line. In the preferred embodiment of the invention the diameter of torsion rod 206 is larger than the diameter of torsion rod 206a. The reason for the dissimilar torsion rods 206 and 206a (or tubes 206') is to permit the generation of different levels of reaction force when one or the other of the torsion rods or tubes is twisted.

The axle assembly 198 further includes end portions or assembly 210. Each end portion 210 includes a hollow body 212 having splined bore 214. The splined ends 208 and 208a of the torsion bar assembly 200 are received within a respective splined bore 214 of each end assembly 210. Each body 212 includes a narrow first portion 216 received within the through bore 40 for providing a bearing surface about which the spool 30 can rotate, a first shoulder 218 which is received within an annular groove 220 of the spool 30 which acts as a thrust bearing to absorb lateral loads and to laterally stabilize the spool 30. Each end assembly 210 further includes a second portion 222 which is received within respective opening 28a and 28b in the retractor frame 22. Each opening operates as a bearing to rotationally support the axle assembly 198. If desired a separate bearing can be inserted in the openings. Positioned adjacent the second portion of each end assembly 210 is a third portion 230 upon which is received a respective lock wheel 56 having lock teeth 58. The lock wheels can be positioned upon the second portion 222 in which case the third portion of each end assembly 210 is received within the frame openings 28a,b such that the lock wheels are positioned in-board of the frame sides 24a,b between the sides and the flanges of the spool. Each end assembly 210 further includes a ratchet wheel 74 or 74a having teeth 76 (and 76a). The ratchet wheels can be formed as an integral part of each end assembly or attached thereto.

As will become apparent from the description below the retractor 20 includes two independently activated energy absorbing mechanisms which in this present invention are formed by the two torsion rods 206 and 206a, the end assemblies 210 and associated locking mechanisms. These energy absorbing mechanisms will permit the spool 30 to rotate relative to the axle assembly 198 when the seat belt is loaded by the occupant during an accident. The energy absorbing mechanisms will each generate a reaction force controllably impeding the rotation of the spool and the protraction of the seat belt. The energy absorbing mechanisms, as described below, will permit the generation of two different levels of controlled reaction force if activated independently and a third level of reaction force if activated simultaneously.

Figure 1:
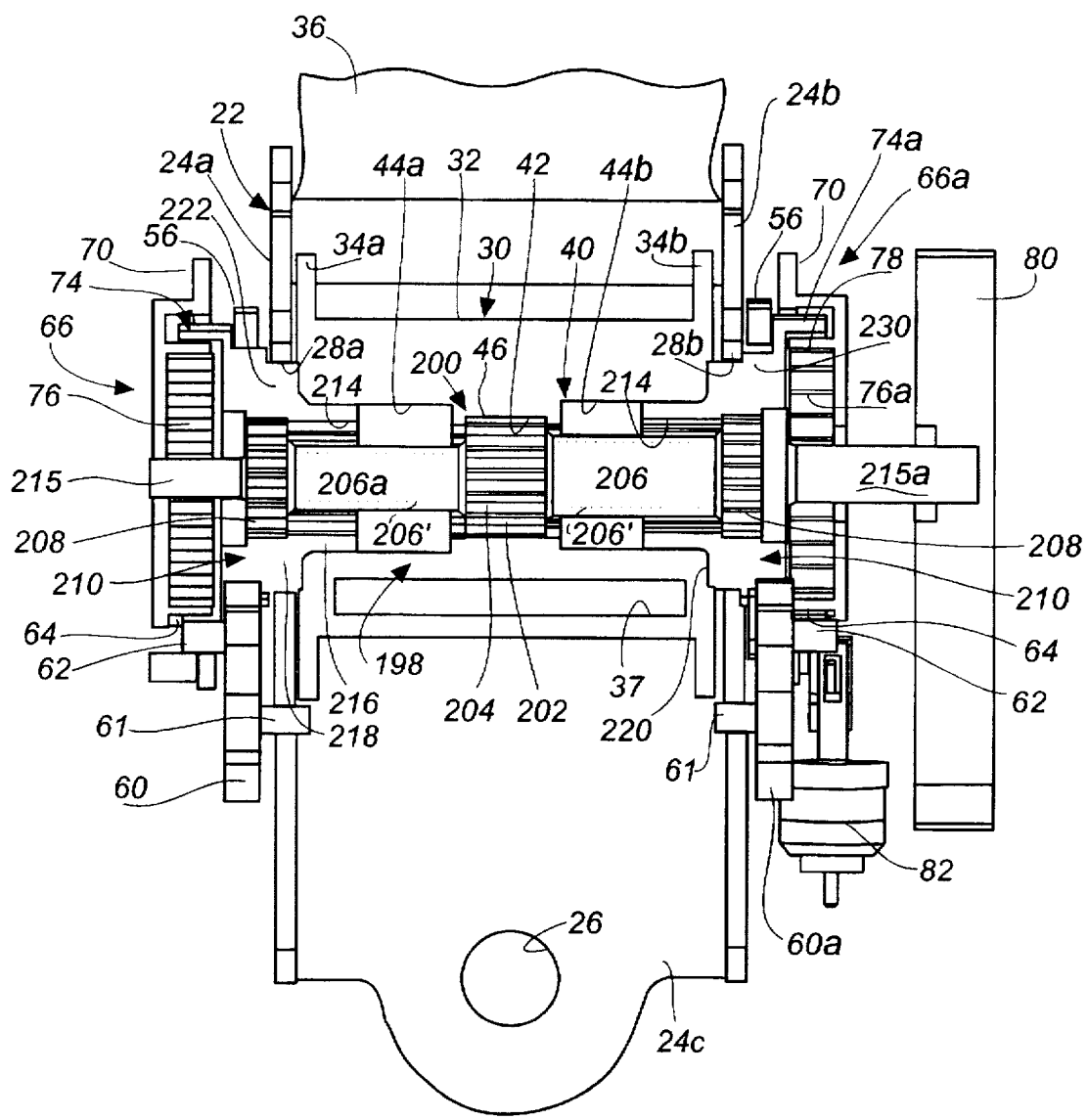
FIG. 1 is a front plan view of the present invention.

The lock teeth 58 of each lock wheel 56 are engaged by rotationally mounted lock pawls 60 (and 60a) (see FIGS. 1, 3 and 4) pivotally supported on pins 61 on opposing sides of the frame 22. Each lock pawl 60 and 60a includes an extending pin 62 which is received within a cam surface 64 of a respective lock cup 66 or 66a located on opposite sides of the retractor frame. One such lock cup is shown in European Patent Application EP 0 228 729 A1 which is incorporated herein by reference. As is known in the art retractors include a web sensor (to initiate lock-up of the retractor when the webbing is protracted at a determinable level) and a vehicle sensor. Such a web sensor (not shown) is included within the lock cup 66a. Each lock cup 66 or 66a includes a plate 70.

Returning to the figures, in the present case, the torsion bar assembly 200 includes an extending stub axle 215 which extends from the splined portion 208 of the torsion bar assembly 200. Lock cup 66 is loosely secured about the stub axle 215. Extending from the other end of the torsion bar assembly 200 is a second stub axle 215a which acts as a spring arbor to receive an end of a return spring 80 which is used to rewind the seat belt 32 upon the spool 30. Lock cup 66 is loosely secured about stub axle 215.

As mentioned above each splined portion 208 and 208a of the torsion bar assembly 200 is received within a corresponding splined portion 214 of the end assemblies 210. This construction rotationally fixes each splined portion to its end assembly 210. Additionally, by virtue of this connection, the stub axles 215 and 215a rotate with the respective end assemblies 210 and their ratchet wheels 74 and 74a. The lock cup 66a (attached to frame side 24b) includes a web sensor, which is not illustrated, (which is not the case for lock cup 66) comprising an inertial mass which is located within the lock cup, which moves to engage internal teeth 78 of the ratchet wheel or lock cup when the seat belt webbing is protracted at a rate greater than a predetermined level, thereby linking the plate 70 of latch cup 66a with the ratchet wheel 74a and axle 215a, causing the lock cup 66a to rotate, thereby moving the lock pawl 60a into engagement with its mating lock teeth 58. As mentioned above such a construction is generally known in the art.

Figure 3:
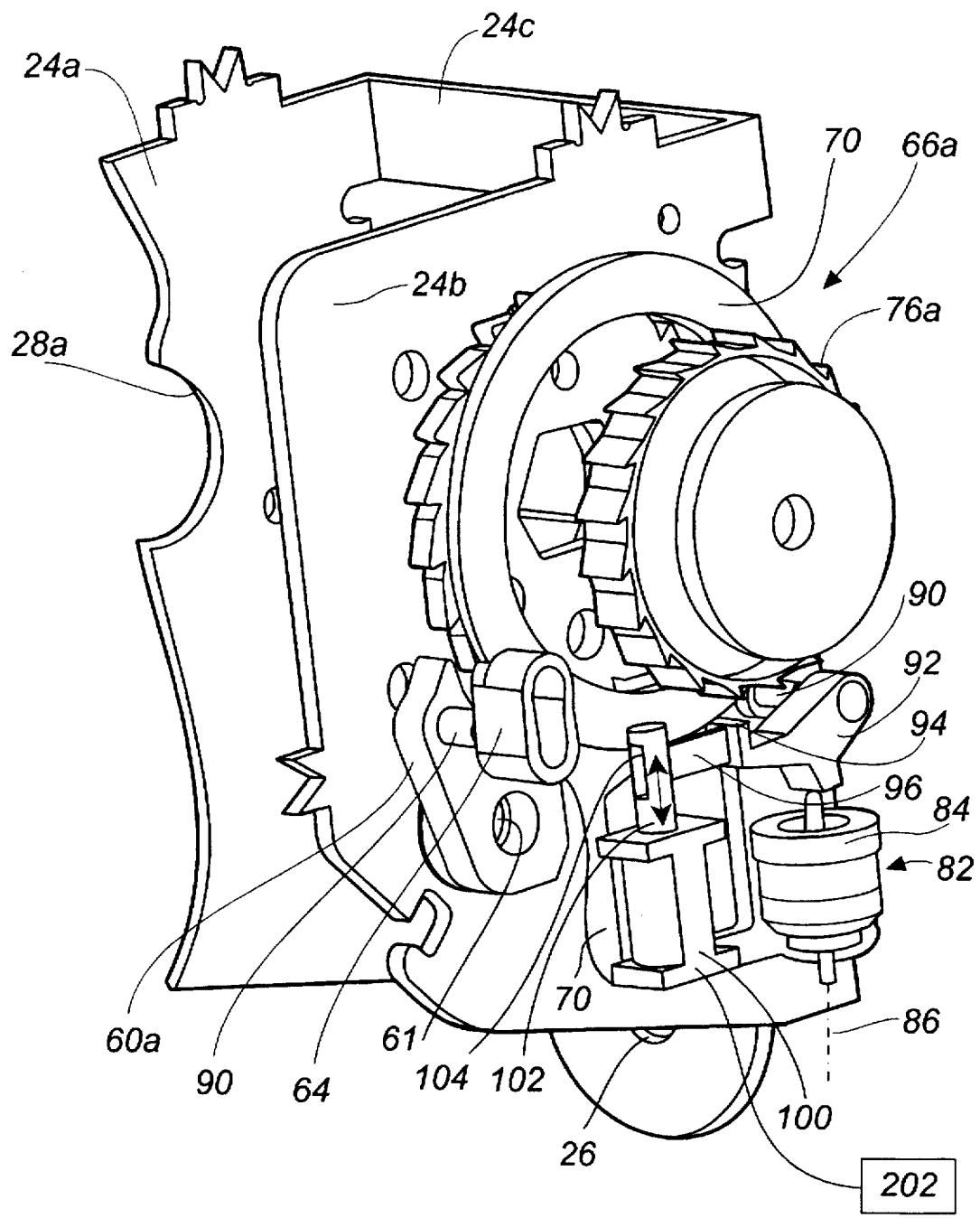
FIG. 3 is an isometric view illustrating a lock cup, vehicle sensor and solenoid.
Figure 4:
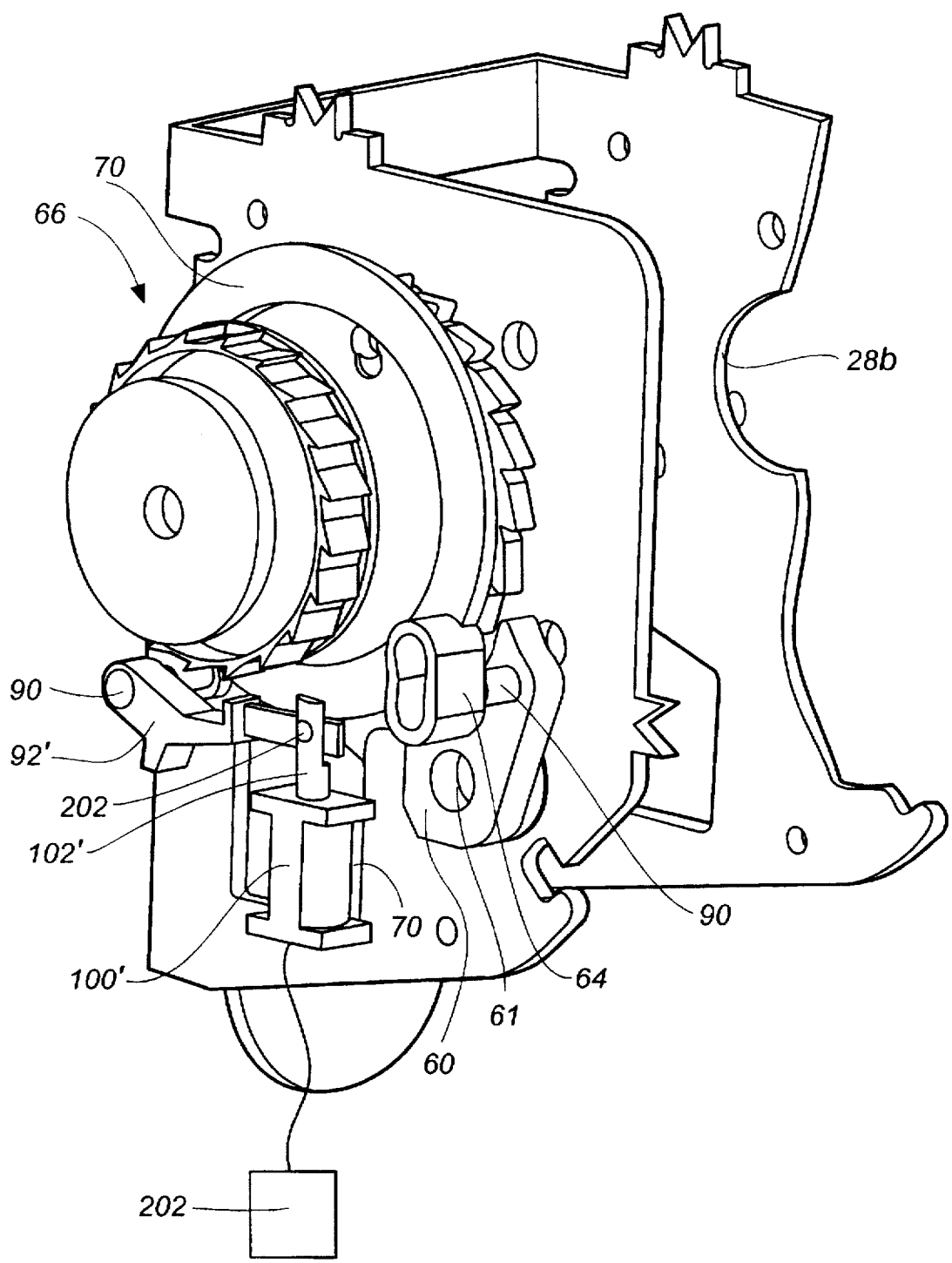
FIG. 4 is a left-side isometric view of a retractor illustrating a locking mechanism and solenoid.

Reference is made to FIG. 3, which shows a vehicle (inertia) sensor generally shown as 82 which is associated only with lock cup 66a. The various parts of the lock cup are slightly separated for ease of illustration. This is true of FIG. 4 as well. In the illustrated embodiment this vehicle sensor is a standing man sensor having an inertial element 84 which tips relative to a center axis 86 when the vehicle decelerates greater than a predetermined level. The vehicle sensor 82 is situated upon, movable with and is supported on plate 70 of the lock cup 66a. Also pivotably mounted to the plate 70 of the lock cup 66a about pin 90 is a sensor pawl generally shown as 92. The sensor pawl includes a toothed portion 94 which is moved into engagement with the ratchet wheel teeth 76a and an extending arm 96. Also supported on plate 70 of lock cup 66a is an electrically responsive solenoid 100 having a movable plunger 102 with a slot 104 formed therein. As can be seen, the arm 96 is received through the slot 104. The slot 104 is oversized such that during normal operation of the vehicle, motion of the sensor pawl 92, caused by motion of the sensor 82, is not interfered with by the plunger 102. During normal operation of the vehicle involving a relatively high level of vehicle deceleration (which might occur in an accident or as a result of severe brake application), the inertial sensor will tip which in turn causes the sensor pawl 92 to rotate about its pivot 90 moving its toothed portion 94 into mating engagement with the teeth 76a on the ratchet wheel 74a. This coupling links the lock cup 62a to the axle, causing the lock cup 66a to rotate and to move the lock pawl 60a into engagement with the lock wheel, preventing protraction of the seat belt webbing from the spool 30.

Lock cup 66 (see FIG. 4), located on side 24a of the frame, supports a second solenoid 100' having a plunger 102' that is pivotably connected via pin 202 to a sensor pawl 92' (which is substantially identical to sensor pawl 92) that is pivoted about a pin 90 associated with the plate 70 of the lock cup 66. Upon activation of solenoid 100', the sensor pawl 92' is moved upwardly into engagement with the teeth 76, coupling the lock cup 66 to the motion of the axle assembly 198, thereby moving pawl 60 into engagement with its corresponding lock wheel 56. Lock cup 66 does not include a web or inertia sensor but these sensors could be incorporated therein.

The following illustrates the operation of the present invention. During the normal operation of the retractor, the webbing can be protracted as the occupant moves forward and retracted by the rewind spring as the occupant returns to the normal seated position. As mentioned above, the retractor includes a mechanical locking mechanism comprising a web sensor and a mechanical vehicle sensor 82. During the normal operation of the vehicle, there may be non-accident instances where the webbing is pulled out at a rate which will activate the web sensor, or the vehicle is decelerated at a level which would activate the mechanical vehicle sensor 82 thereby bringing the associated locking pawl 60a into locking engagement with its lock wheel, thereby halting the protraction of the seat belt webbing.

There will be instances, however, where the vehicle is involved in a crash. Such a crash, as sensed by an appropriate crash sensor (not shown), will typically involve deceleration levels that are greater than that which would be achieved during normal operation of the vehicle.

On sensing a crash of a first level, an electronic control unit, generally shown as 202, associated with a crash sensor will generate a first activation signal which will cause the plunger 102' to move upwardly a sufficient amount, such that the arm 96' of the sensor pawl 92' will be lifted into engagement with the lock teeth, thereby coupling the lock cup 66 to the retractor axle and causing the lock pawl 60 to move into engagement with the lock wheel, thereby momentarily locking the spool and prohibiting the protraction of the seat belt. The action of the solenoid 100' will typically precede similar motion of the mechanical inertia sensor 82 which would also move the pawl 92 into engagement with the ratchet wheel 74a. During the crash, the occupant will typically move forwardly, loading the seat belt. These forces are transmitted directly to the webbing 36 and to the spool 30. As these forces or torques increase, the spool 30, through its splined connection to the torsion bar assembly 200 will rotate as torsion rod 206a twists. It should be appreciated that the splined end 203 of the torsion rod 206a will not rotate after its corresponding lock wheel 56 is locked. As the crash forces increase the spool 30 will be rotated in a direction of seat belt protraction and simultaneously be resisted by the reaction forces generated by torsion rod 206a as it continues to twist. In this manner, during a crash of a first level or magnitude, the manner in which seat belt is permitted to protract and the forces input to the occupant via the seat belt are controlled. As can be appreciated, since lock cup 66 has no mechanical inertia sensor or web sensor, its activation is entirely electrical.

If the ECU 202 determines that the crash is at the first level, the ECU will generate a control signal which causes the plunger 102 to be maintained in its lower position, thereby preventing the activation of lock cup 66 by the mechanical sensor 82.

If the ECU 202 determines that the vehicle is involved in a crash of a greater second level, the ECU will generate a control signal to activate solenoid 100 which is carried by lock cup 66a situated relative to frame side 24b. Upon activation of solenoid 100, the sensor pawl 92 is moved upwardly into engagement with the teeth 76a, coupling the lock cup 66a to the motion of the corresponding end assembly 210, thereby moving pawl 60a into engagement with its corresponding lock wheel 56 locking the end assembly 210 of the axle assembly (and the splined end 208 of the torsion rod 206a) During this crash, the torsion rod 206 (which is thicker than torsion rod 206a) will be twisted as the spool rotates generating (as with the twisting of rod 206a) a predetermined reaction force proportionally to the physical characteristics of the torsion rod 206 to a) control the forward motion of occupant and b) to control the dynamics of the protraction of the seat belt in the manner similar to that described above. To achieve three levels of reaction torque it is desirable to make torsion rod 206 dissimilar from torsion rod 206a so that the retractor may generate a different level of reaction force retarding the motion of the occupant in correspondence to the activation of the locking mechanisms including the lock cups 66 and 66a.

If the ECU 202 determines that the crash is of a significantly high level requiring the generation of a high retarding force on the seat belt, this will be accomplished by simultaneously generating control signals to both solenoids 100 and 100', thereby causing both lock pawls 60a and 60b to respectively lock both sides of the torsion bar assembly 200. As can be appreciated, any rotational motion of the spool will not be resisted by the forces necessary to twist both torsion rods 206 and 206a.

In summary, it can be seen that the present retractor can generate a multi-level retarding force by activating one or the other of the energy dissipating members of the present invention, or alternatively, can generate a third level of retarding force by activating both energy absorbing members simultaneously. It should also be appreciated that by virtue of the incorporation in the present invention of the solenoid 100 and inertial mass sensor 82, which both act upon and move the sensor pawl 92, that the present invention provides a high degree redundancy in its operation in that if for some reason the ECU 200 could not or does not generate the appropriate activation signals to the solenoids 100 or 100', the inertial sensor 82 will have moved the sensor pawl 92 into locking readiness with the ratchet wheel 74a, which in turn causes lock pawl 60a to move into engagement with its corresponding lock wheel. If the forces that are generated on the seat belt are sufficiently high, the spool 30 will rotate and in doing so be resisted by both energy absorbing mechanisms.

As can be appreciated from the above, the level of control force generated by the energy absorbing mechanisms to oppose the rotation of the spool 30 and permit the controlled protraction of the seat belt will vary with the size of individual torsion rods 206 and 206a. Further, it may be desirable to size the torsion rod associated with the mechanical inertia sensor to generate a level of control force associated with a moderate or high level crash as the inertia sensor provides for redundancy and to size the other (electrically activated) energy absorbing mechanism (torsion rod 206) to generate a control force when the vehicle is involved in a lower level accident.

Many changes and modifications in the above described embodiment of the invention can, of course, be carried out without departing from the scope thereof. Accordingly, that scope is intended to be limited only by the scope of the appended claims.

We claim:

1. An energy absorbing retractor (20) having
  a spool having a through bore,
  a frame, a locking mechanism to initially stop the spool from rotating in a belt protraction direction, the spool rotationally supported relative to the frame,
  a seat belt wound about the spool, and
  bias means to retract the seat belt,
  torsion means for generating at least a first level of reaction torque on the spool permitting the spool to rotate in a controlled manner in a belt protracting direction including a torsion mechanism having an intermediate portion and a first torsion member extending therefrom and located at least partially within the bore, the intermediate portion fixedly coupled to the spool to prevent relative rotation therebetween, the intermediate portion situated within the bore but remote from the ends of the bore, the first torsion member including a first end coupled to first locking mechanism to prevent the first end from rotating upon such coupling, whereby upon locking of the first end, and the loading of the spool, the first torsion member twists to generate a first level of control force.

2. An energy absorbing retractor having
  a spool,
  a frame, a locking mechanism to initially stop the spool from rotating in a belt protraction direction, the spool rotationally supported relative to the frame,
  a seat belt wound about the spool, and
  bias means to retract the seat belt,
  torsion means for generating at least a first level of reaction torque on the spool permitting the spool to rotate in a controlled manner in a belt protracting direction including a torsion mechanism having an intermediate portion and a first torsion member extending therefrom, the intermediate portion fixedly coupled to the spool to prevent relative rotation therebetween, the first torsion member including a first end coupled to a first locking mechanism, whereby upon locking of the first end, and the loading of the spool, the first torsion member twists to generate a first level of control force;
  wherein the torsion mechanism includes a second torsion member extending from the intermediate portion opposite to the first torsion member, the second torsion member including a second end coupled to a second locking mechanism to prevent the second end from rotating upon such coupling, whereby upon locking of the second end, and the loading of the spool, the second torsion member twists to generate a second level of control force.

3. The device as defined in claim 2 wherein the first and second levels are different.

4. The device as defined in claim 2 wherein the retractor includes control means for locking the first and second ends of the first and second torsion members relatively simultaneously.

5. The apparatus as defined in claim 2 wherein one of the first or second lo-king mechanisms includes a mechanical inertial sensor means for initiating the locking up of an end of the torsion mechanism and wherein the retractor further includes control means for preventing the sensor means from locking the torsion mechanism.

6. The apparatus as defined in claim 5 wherein the control means comprises an electrically operated solenoid.

7. The apparatus as defined in claim 2 wherein the torsion members are torsion rods.

8. The apparatus as defined in claim 7 wherein the diameter of each torsion rods is different.

9. The apparatus as defined in claim 2 wherein the torsion members are torsion tubes.

* * * * *